(12) United States Patent
Kimura et al.

(10) Patent No.: US 9,536,450 B2
(45) Date of Patent: Jan. 3, 2017

(54) VISUAL TRAINING DEVICE, VISUAL TRAINING METHOD, AND COMPUTER-READABLE STORAGE MEDIUM

(75) Inventors: Kenji Kimura, Toyota (JP); Satoshi Shioiri, Sendai (JP); Mitsuharu Ogiya, Sendai (JP)

(73) Assignees: TOYOTA JIDOSHA KABUSHIKI KAISHA, Toyota (JP); TOHOKU UNIVERSITY, Sendai-shi (JP)

( * ) Notice: Subject to any disclaimer, the term of this patent is extended or adjusted under 35 U.S.C. 154(b) by 0 days.

(21) Appl. No.: 13/367,803

(22) Filed: Feb. 7, 2012

(65) Prior Publication Data

US 2012/0208170 A1 Aug. 16, 2012

(30) Foreign Application Priority Data

Feb. 16, 2011 (JP) .................. 2011-031088

(51) Int. Cl.
*G09B 19/16* (2006.01)
(52) U.S. Cl.
CPC .................. *G09B 19/167* (2013.01)
(58) Field of Classification Search
CPC ........... G09B 5/00; G09B 7/00; G09B 19/167; A61B 3/024
USPC ................ 434/236, 219, 322–365
See application file for complete search history.

(56) References Cited

U.S. PATENT DOCUMENTS

| 6,273,726 | B1 * | 8/2001 | Kirksey et al. | 434/169 |
| 6,364,486 | B1 * | 4/2002 | Ball et al. | 351/203 |
| 8,348,671 | B2 * | 1/2013 | Delahunt et al. | 434/236 |
| 2006/0087618 | A1 | 4/2006 | Smart et al. | |
| 2006/0234199 | A1 * | 10/2006 | Walker et al. | 434/323 |

FOREIGN PATENT DOCUMENTS

| JP | A-10-071121 | 3/1998 |
| JP | A-2005-524432 | 8/2005 |
| JP | A-2007-068579 | 3/2007 |

OTHER PUBLICATIONS

Owsley, Cynthia, "Vision and Driving in the Elderly," *Optometry and Vision Science*, 1994, pp. 727-735, vol. 71, No. 12, American Academy of Optometry.

* cited by examiner

*Primary Examiner* — Timothy A Musselman
(74) *Attorney, Agent, or Firm* — Oliff PLC (57) ABSTRACT

A visual training device includes a training image display unit that outputs a training image including a given first figure that appears at substantially irregular intervals of time at a particular position in a peripheral portion of a screen of a display, and an processed image output unit that superimposes the training image output from the training image display unit, on a video content received from an outside, and outputs a resulting image to the display.

13 Claims, 5 Drawing Sheets

50 SECONDS

VISUAL TRAINING DEVICE, VISUAL TRAINING METHOD, AND COMPUTER-READABLE STORAGE MEDIUM

INCORPORATION BY REFERENCE

The disclosure of Japanese Patent Application No. 2011-031088 filed on Feb. 16, 2011 including the specification, drawings and abstract is incorporated herein by reference in its entirety.

BACKGROUND OF THE INVENTION

1. Field of the Invention

The invention relates to visual training device and method, and a computer-readable storage medium, for improving visual cognitive abilities of vehicle drivers.

2. Description of Related Art

It is important for a driver who is driving a vehicle to become aware of the presence of an obstacle, such as a pedestrian or a bicycle, in the peripheral field of view, as immediately as possible. Various technologies have been developed so as to improve visual cognitive abilities of drivers, or assess the abilities. For example, a visual ability assessment system for determining visual ability of a subject is described in Japanese Patent Application Publication No. 10-071121 (JP-A-10-071121). The visual ability assessment system includes a plurality of push-button switches arranged in a matrix on an operation board, each of the switches incorporating a display element. In operation, the display elements of the switches cause numbers or characters (such as letters) to be displayed according to a predetermined display sequence for assessment. A subject standing in front of the operation board pushes a push-button switch corresponding to a number or character displayed on the board when the number or character displayed is a number or character to which the subject should react or respond. According to the technology described in JP-A-10-071121, the assessment and training of the visual ability of the subject are conducted in this manner.

However, the technology described in JP-A-10-071121 requires large-scale equipment as the assessment system, including the dedicated or special operation board, and also needs to secure time for training; therefore, the visual training or assessment can be carried out at limited locations and limited opportunities.

SUMMARY OF THE INVENTION

The invention provides visual training device and method, and a computer-readable storage medium, with which visual training can be conducted during viewing of a desired video content.

A visual training device according to a first aspect of the invention includes a training image display unit that generates a training image such that a given first figure appears at substantially irregular intervals of time, at a particular position in a peripheral portion of a screen of a display, and an output unit that superimposes the training image generated from the training image display unit, on a video content received from an outside, and generates a resulting image to the display.

According to the first aspect of the invention, the user can do visual training regarding the peripheral field of view, without being particularly conscious of being trained, during viewing of a video content. Therefore, the burden imposed on the user by the training is extremely small, and positive execution of the training is expected.

The training image display unit may cause the first figure to appear at at least two positions selected from four positions close to four corners of the screen of the display.

The visual training device may further include a test image output unit that generates a test image such that the first figure appears at substantially irregular intervals of time, at the particular position on the screen of the display, and such that the brightness of a given second figure located at a middle of the screen of the display changes at substantially irregular intervals of time, and a testing unit that detects the presence of a response entered by a user who recognizes appearance of the first figure when the first figure appears at the particular position on the screen of the display, while the test image is generated. With this arrangement, the result of the visual training can be measured by a simple method.

A visual training method according to a second aspect of the invention includes generating a training image such that a given first figure appears at substantially irregular intervals of time, at a particular position in a peripheral portion of a screen of a display, and superimposing the generated training image on a video content received from an outside, and generating a resulting image to the display.

According to a third aspect of the invention, there is provided a computer-readable storage medium that stores computer-executable instructions for performing visual training functions, including: generating a training image such that a given first figure appears at substantially irregular intervals of time, at a particular position in a peripheral portion of a screen of a display, and superimposing the generated training image on a video content received from an outside, and generating a resulting image to the display.

According to the second and third aspects of the invention, like the first aspect of the invention, the user can do visual training regarding the peripheral field of view, during viewing of a video, content, such as a television program, and the burden imposed on the user by the training can be reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
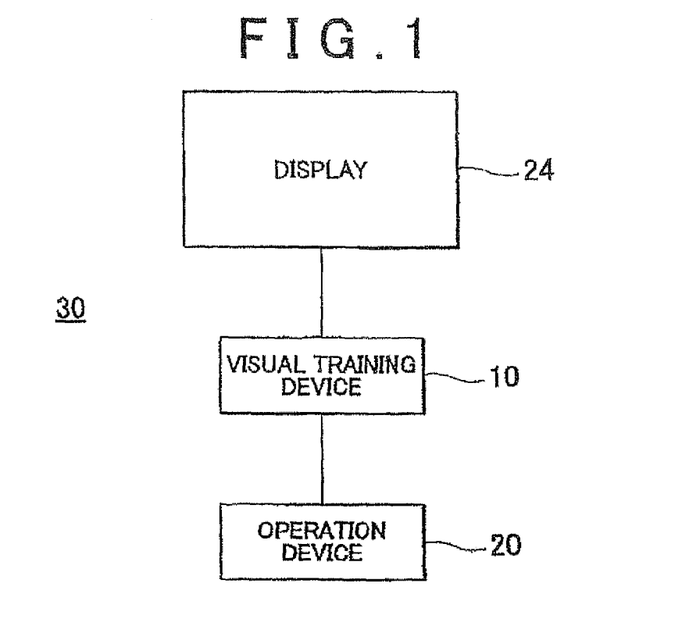
FIG. 1 is a view showing the overall configuration of a system using a visual training device according to one embodiment of the invention.

FIG. 1 shows the overall configuration of a visual training system 30 using a visual training device 10 according to one embodiment of the invention. The visual training device 10 is connected to a display 24, which may be, for example, a television set. The user may give commands and/or responses to the visual training device 10, using an operation device 20, such as a button(s), lever(s), keyboard, or a mouse, having a wired connection with the visual training device 10, or a remote controller wirelessly connected to the visual training device 10.

The visual training device 10 is intended to mainly improve visual cognitive ability of a vehicle driver. As will be described later, the visual training device 10 has a visual training function of displaying images for training the sense of sight on the display 24, a testing function of displaying images for testing or assessing the visual cognitive ability after the training, and a result display function of displaying a test result.

The visual training device 10 superimposes the above-mentioned images for training on a video content, such as a normal television program or a video picture, and displays the superimposed images, so as to provide visual training. Therefore, the user can accomplish visual training without being particularly conscious of it, while watching the television program or video picture, for example.

The visual training device 10 and the display 24 may be integrally constructed as a unit. Namely, the visual training device 10 may be incorporated as a part of a television set, smartphone, car navigation system, or the like, including the display 24. In this case, the television set, smartphone, or car navigation system may be manipulated or operated so as to invoke the training function or testing function, which will be described later.

The visual training device 10 may be incorporated into another device connected to the display 24. For example, the visual training device 10 may be incorporated into a DVD player or recorder connected to a television set, a personal computer, or the like. A screen may be used in place of the display 24, and the visual training device 10 may be incorporated into a projector that projects images onto the screen.

Instead of incorporating the visual training device into the television set, recorder, or the like, at the factory and providing the above functions, as described above, the functions (such as the visual training function) corresponding to the functions of the visual training device may be provided in the form of software, and the software may be installed in a conventional television set, personal computer, car navigation system, smartphone, or the like. The software may be supplied in the form of a storage medium, such as a DVD or a flash memory, or the software may be acquired by downloading if the television set or personal computer is configured to be connected to the Internet.

Figure 2:
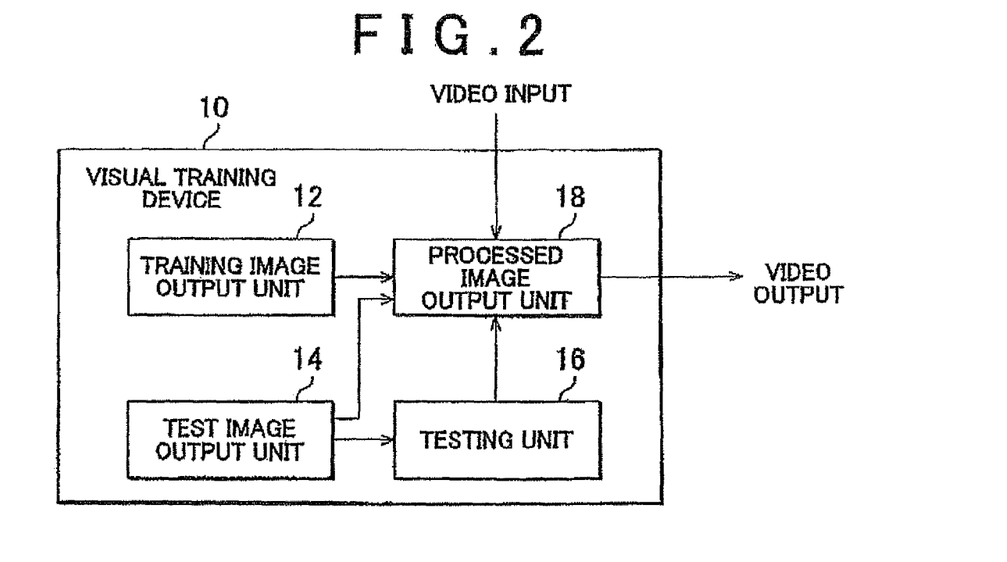
FIG. 2 is a block diagram showing the configuration of the visual training device of FIG. 1.

FIG. 2 is a block diagram showing the configuration of the visual training device 10 according to this embodiment of the invention. Each block may be implemented by hardware, such as a CPU, memories, and other devices of a computer, and mechanical devices, and/or may be implemented by software, such as a computer program. In this specification, each block will be described as a functional block that is implemented through coordination or cooperation between the hardware and the software. Thus, the functional blocks as shown in FIG. 2 can be implemented in various forms by combination of hardware and software.

A training image display unit 12 outputs a training image for enhancing the visual cognitive ability of the user, in particular, cognitive ability regarding the peripheral field of view, to an output unit 18. Although details will be described later with reference to FIGS. 4A-4C, the training image display unit 12 outputs a training image including at least one given figure (e.g., a white circle) that appears at substantially irregular intervals of time at a particular position in a peripheral portion of the screen of the display.

A test image output unit 14 outputs a test image for assessing improvement of the cognitive ability of the user due to visual training performed on the user, to the processed image output unit 18. Although details will be described later, the test image output unit 14 outputs a test image including at least one given figure (e.g., such as a white circle) that appears at substantially irregular intervals of time, at a particular position on the screen of the display, and a given feature (e.g., a white circle) located at the middle of the screen of the display, the brightness of which changes at substantially irregular intervals of time.

A testing unit 16 detects the presence of a response entered by the user (i.e., detects a responding operation performed by the user) when the user recognizes the appearance of a white circle at a particular position on the screen of the display, while the test image is output by the test image output unit 14. Then, the testing unit 16 calculates the percentage of correct answers, and outputs an image representing the result.

The processed image output unit 18 superimposes the training image output from the training image display unit 12, on a desired video content (e.g., pictures of a television program, pictures of DVD, etc.) received from the outside, and outputs the superimposed image to the display 24. With regard to the test image output from the test image output unit 14 and the test result image output from the testing unit 16, the processed image output unit 18 outputs only the test image or the test result image to the display 24, without outputting any video content received from the outside.

In the following, the operation of the visual training device 10 will be described.

Figure 3:
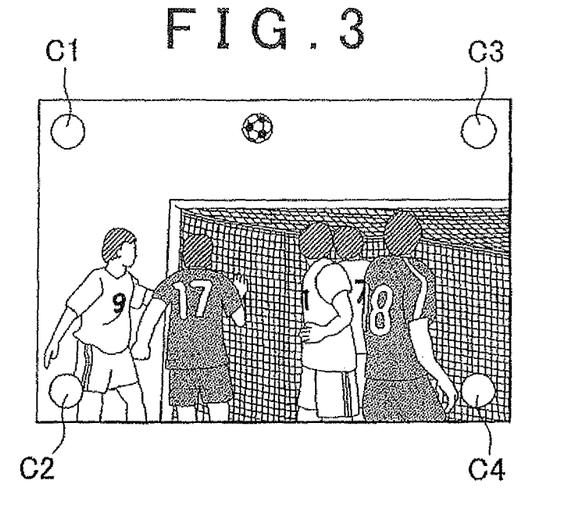
FIG. 3 is a view showing one example of screen during execution of training.

FIG. 3 shows one example of screen during execution of training. FIG. 3 shows a display screen when a training image is superimposed on a video content as a television program. The training image includes of figures C1-C4 displayed substantially at random at predetermined positions on the four corners of the screen. While the figure is a white circle in the example of FIG. 3, it may have any desired color or shape. It is, however, preferable to select the figure from those that can be distinguished from the video content as clearly as possible, or those that will not be buried or lost in the video content. The white circles C1-C4 will be called "peripheral stimuli".

While the four white circles C1-C4 are displayed at the same time in FIG. 3, one of the four white circles is displayed at most in the actual training image, and the order and interval of display are set at random, using pseudo-random numbers, for example. As one example, white circles C1-C4 are presented at one location at irregular intervals of about 3 to 10 seconds, and the frequency is about 12 times per min. on average. At this time, the brightness of the white circle gradually increases, and then gradually decreases, namely, the white circle becomes gradually brighter, and then becomes gradually darker. The brightness of the white circle may be changed according to a Gauss function (time of presentation: about 400 msec., σ=100 msec.), or according to another suitable function, such as square waves.

The video content will be called "central stimuli". Since it is possible to naturally direct the user's attention to a central portion of the screen, by reproducing a video content in which the user is interested, the video content can play the role of the central stimuli.

In this embodiment, the training image is superimposed on the video content, such as a television program, and thus a white circle is displayed in the peripheral portion of the screen. Therefore, the user observes the figure that appears at random in the peripheral field of view, while viewing the video content. This form of viewing corresponds to training in which the peripheral stimuli are irregularly given to the user while at the same time the central stimuli are continuously given to the user. This is analogous to a situation where a driver who is driving a vehicle needs to recognize another vehicle or a pedestrian(s) abruptly coming from the surroundings, while always paying attention to the front of the vehicle.

By using a video content as central stimuli, as described above, it is possible to alleviate or reduce physical and psychological burdens of the training on the subject (or user). Furthermore, once a command for start of training is initially given to the visual training device 10, the user is then only required to simply watch video pictures, without being particularly conscious of being trained, and is not required to make a response by, for example, operating buttons, at the time of appearance of peripheral stimuli; therefore, the user feels substantially no sense of burden. This enables the user to do visual training for a long time, over which it is difficult for the user who is trained with the training system of the related art to sustain his/her concentration.

It is most desirable that the figures presented in a training image appear at the four corners of the screen, as described above. This is because the user tends to pay the greatest attention to a central portion of the screen of the display, and the effect of enlarging the peripheral field of view is maximized if the figures are displayed at the four corners. However, the figures may be displayed at positions other than the four corners, provided that they are located in the peripheral portion of the screen of the display. For example, figures may be located in or around middle portions of the four sides of the screen peripheral portion. Also, the number of figures is not limited to four, but may be two or three, or may be five or more.

The video content on which the training image is superimposed is, not limited to the one, such as a television program, selected by the user. For example, training image may be superimposed on video pictures, such as traffic safety education pictures, played at driver licensing centers. In this case, the effect of the training may be checked by conducting the above-described test during an aptitude test after playing of the pictures.

Figure 4A:
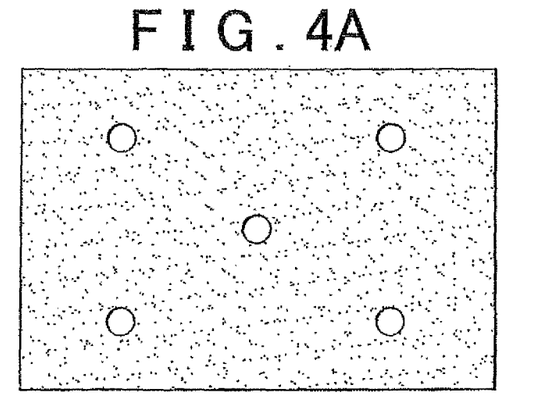
FIG. 4A through FIG. 4C are views each showing one example of screen during execution of a test.

FIG. 4A through FIG. 4C illustrate one example of screen during execution of the test. FIG. 4A shows a condition where all of the stimuli are displayed. In FIG. 4A, the central white circle corresponds to a central stimulus, and the remaining four white circles correspond to peripheral stimuli. The central white circle is always displayed on the screen, though its brightness changes as described below. The peripheral four white circles appear substantially at random.

Figure 4B:
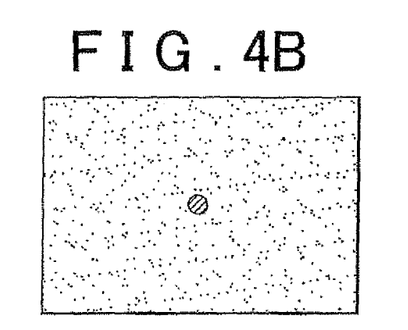
Figure 4C:
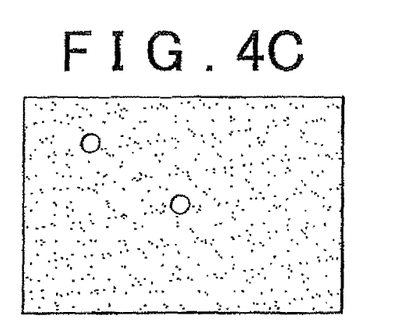

In the test, two tasks are presented. One of the tasks is called "central task", which requires the user to make a response using an operating part, when the brightness of the central white circle is reduced, as shown in FIG. 4B. The reduction of the brightness may take place in the form of square waves, and the brightness may be reduced for a period of, for example, 50 msec. The other task is called "peripheral task", which requires the user to make a response using an operating part, when any of the four white circles appears in the peripheral portion, as shown in FIG. 4C. Each of the four white circles is presented such that the brightness gradually increases from zero, and then gradually decreases after reaching a given brightness level. The brightness of the white circle may be changed according to, for example, a Gauss function (time of presentation: about 400 msec., σ=100 msec.).

Figure 5:
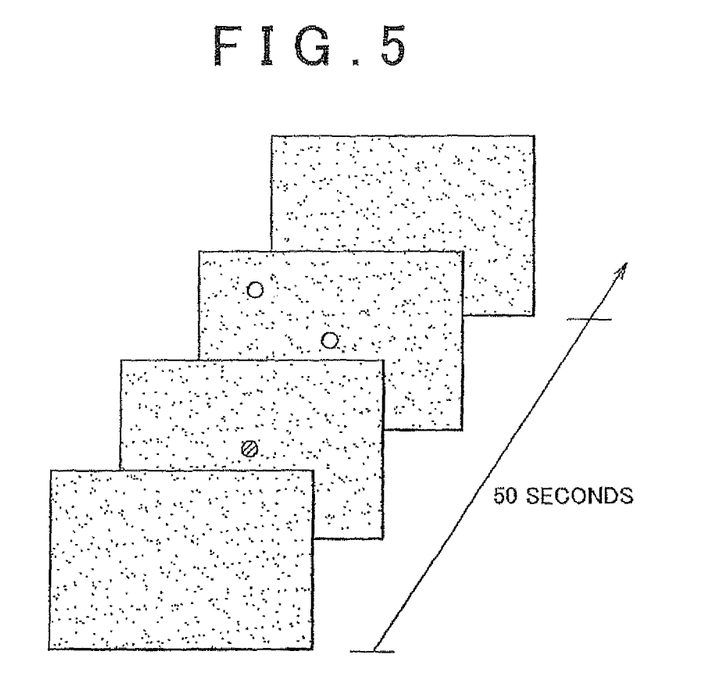
FIG. 5 is a view showing an example of transition of screens during execution of a test.

FIG. 5 shows one example of screen transition during execution of a test. In this test, three tasks, namely, "central task" that requires a subject to respond to only the central stimuli, "peripheral task" that requires the subject to respond to only the peripheral stimuli, and "dual task" that requires the subject to respond to both the central stimuli and the peripheral stimuli, are given to the subject. The three tasks are different only in terms of an object (central stimulus or peripheral stimulus) to which the subject responds, and the same test image is used and presented to the subject in the three tasks. In the dual task, however, the subject is notified in advance that a higher priority should be given to responding to central stimuli.

The test image consists of 12 blocks in total, namely, four blocks of central tasks, four blocks of peripheral tasks, and four blocks of dual tasks. The duration of one block is 50 seconds, and the central stimuli and peripheral, stimuli are respectively presented eight times. The brightness of the central stimuli changes substantially at random in the form of square waves, and the duration of a single reduction of the brightness is 50 msec. The brightness of the peripheral stimuli changes substantially at random according to the Gauss function, and the duration of single presentation of the peripheral stimuli is 400 msec. The task in each block is taught in letters or characters at the beginning of the block. The 12 blocks are grouped as one set, and three sets of tasks are carried out. After the completion of the test, "the rate of detection of peripheral stimuli" in each set, namely, the ratio of the number (or frequency) of responses by the user, to the number of times a white circle appears in the peripheral portion of the screen; is calculated.

Thus, in the test of this embodiment, the peripheral stimuli are presented at random at any of the four corners of the screen, while the central stimuli are always presented in the middle of the screen, and the rate of detection of the peripheral stimuli is calculated. Thus, the test corresponds to a test for determining whether the driver who is driving the vehicle can respond to another vehicle or pedestrian abruptly coming from the surroundings, while always paying close attention to the front of the vehicle.

Since the test provided by the visual training device of this embodiment is a simple one that only requires the subject to make a response as to whether the subject found a white circle that appeared in the peripheral portion of the screen, there is no need to prepare dedicated or exclusive hardware for enabling the subject to make the response. Where the test is conducted using a television set, it suffices that particular buttons, or the like, on a conventional remote controller are assigned to respective commands. Accordingly, the cost required for the test can be reduced.

Figure 6:
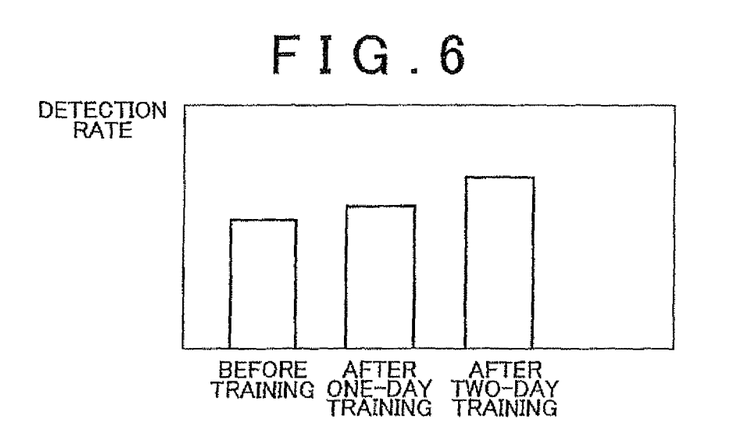
FIG. 6 is a view showing one example of test results generated by a testing unit.

FIG. 6 shows one example of test results output by the testing unit. In FIG. 6, scores, i.e., the rates of detection of peripheral stimuli, obtained in the test conducted before execution of the above-described visual training, the test conducted after one-day training, and the test conducted after two-day training, are indicated in a bar chart. The manner of displaying the scores is not limited to that of FIG. 6, but any desired display form may be used.

Figure 7:
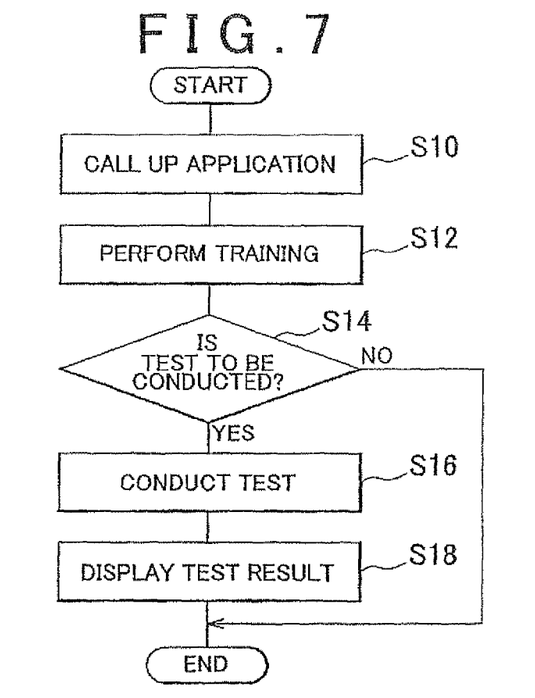
FIG. 7 is a flowchart of visual training and test conducted by the visual training device.

FIG. 7 is a flowchart of visual training and test provided by the visual training device of this embodiment. Initially, the user calls up an application for visual training, using an operation device, such as a remote controller, during viewing of a video content, such as a television program (S10). In response to the call, the above-described training image, which is output from the training image display unit 12 of the visual training device 10, is superimposed on the video content and displayed on the display 24 (S12). The training ends when the training image is displayed for a predetermined period of time (e.g., 5 to 10 min.). A message to ask the user if a test for assessing the effect of training is to be conducted, which is output from the test image output unit 14, is displayed on the display 24 (S14). The user replies to the message, using the operation device, such as a remote controller. If the reply is NO (NO is obtained in step S14), the control flow ends. If the replay is YES (YES is obtained in step S14), the above-described test image, which is output from the test image output unit 14, is displayed on the display 24 (S16). In this case, the test image is not superimposed on the video content, but only the test image is displayed on the display 24. At the conclusion of the test, the results of the current and previous tests, which is output from the testing unit 16, is displayed on the display 24 (S18). If the user pushes a specified button on the operation device, such as a remote controller, the display of the test results is finished, and the video content is reproduced or played back.

In this connection, the visual training device may be configured to automatically start visual training at random, or at previously set times, during reproduction of the video content, rather than starting visual training in response to a command of the user. For example, when it is difficult to encourage a particular group of users, such as the elderly, unskilled in operating some devices to spontaneously perform training, it can be an effective measure to automatically conduct training.

As explained above, during reproduction of a desired video content, such as a television program, the visual training device of this embodiment displays figures, such as white circles, having no relationship with the video content, at four corners of the display, at substantially irregular intervals of time. The user is able to improve his/her cognitive ability regarding the peripheral useful field of view, by watching the video content on which the figures are displayed at random, for a given period of time. With this method, the user can do visual training without being particularly conscious of being trained, while enjoying the desired video content; therefore, the burden imposed on the user is extremely small, and positive execution of the training is expected. Also, since the training is not performed during driving of the actual vehicle, the training can be easily and safely performed on, for example, older drivers.

Also, if the visual training device is incorporated in advance in a television set, or the like, or the visual training function can be incorporated as a retrofit into a television set, or the like, a special device or equipment for training need not be prepared. Accordingly, additional cost for preparing the device is not needed, and the visual training function can be easily implemented, so that the user can easily do training at home, or the like, rather than a special facility. Also, since the contents of the training and the test are remarkably simple, the training and the test can be carried out while the user is out (i.e., not home), using a mobile device, such as a smartphone or a car navigation system.

In the following, the results of experiments for assessment of the effectiveness or usefulness of the visual training device according to the above-described embodiment will be described.

Figure 8:
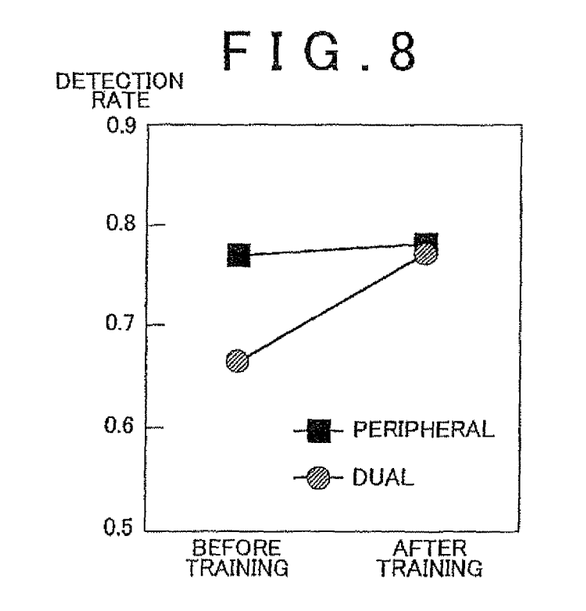
FIG. 8 is a graph indicating results of measurements of changes in cognitive ability before and after training.

FIG. 8 is a graph indicating changes in the rate of detection of peripheral stimuli before and after the above-described visual training. In FIG. 8, the rate of detection in the case where only the peripheral task was presented before training was compared with that after training, and the rate of detection in the case where the peripheral task and the central task were both presented (i.e., the dual task was presented) before training was compared with that after training. Subjects were four young adults (in their 20s). The visual training was conducted for 30 min. per day, over two days in total.

As shown in FIG. 8, substantially no change was observed in the rate of detection (indicated by black squares in FIG. 8) in the case where only the peripheral task was presented, by comparison between the detection rate before training and that after training. On the other hand, about 20% improvement was observed in the rate of detection (indicated by black circles in FIG. 8) where the peripheral task and the central task were both presented, by comparison between the detection rate before training and that after training. It is understood from the results of these measurements that the rate of detection of peripheral stimuli while attention is focused on central stimuli, in the dual task, is largely improved by performing training using the visual training device according to the above-described embodiment. This result may be similarly applied to the cognitive ability or sensitivity to stimuli received by the driver during driving of the vehicle, namely, the driver's ability to notice another vehicle or pedestrian approaching from the right and left sides while paying close attention to the front of the vehicle. Accordingly, it may be said that the training using the visual training device is suitable or useful for improvement of the visual ability of vehicle drivers.

Figure 9:
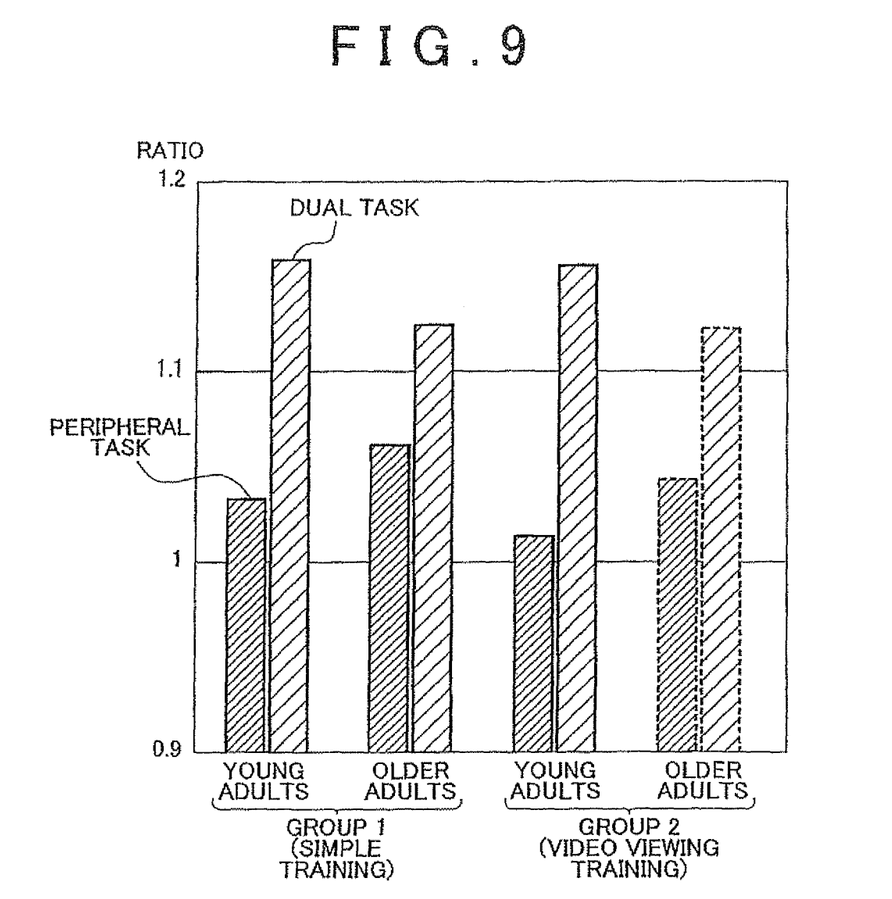
FIG. 9 is a view showing results obtained when visual training was conducted on subject groups of young adults and older adults.

FIG. 9 shows results when visual training was conducted on subject groups of young adults and older adults.

Each graph in FIG. 9 indicates the ratio of the rate of detection of peripheral stimuli after training, to the rate of detection of peripheral stimuli before training. Namely, the ratio is a value obtained by dividing the rate of detection of peripheral stimuli after training, by the rate of detection of peripheral stimuli before training.

In FIG. 9, "GROUP 1" shows results obtained when training (training conducted without using a video content, which will be called "simple training") of viewing a image including central stimuli and peripheral stimuli displayed substantially at random on a screen was performed on each subject group of young adults (three in their 20s) and older adults (three at the age of 65 or older), without using the visual training device according to the embodiment. The simple training was conducted for 15 min. once in a day, over five days in total. "GROUP 2" shows results obtained when training (which will be called "video viewing training") of viewing a image including peripheral stimuli displayed at random while being superimposed on a video content was performed on a subject group of young adults (four in their 20s), using the visual training device according to the embodiment. The video viewing training was conducted for 30 min. once in a day, over two days in total. For each subject group in each of GROUP 1 and GROUP 2, two bar graphs are drawn. Of the two bar graphs, the left-side bar graph indicates a test result obtained when only the peripheral task was presented, and the right-side bar graph indicates a test result obtained, when both the peripheral task and the central task were presented.

It is to be noted that test results on the older adults of GROUP 2 were estimated from the test results of GROUP 1 and the test results on the young adults of GROUP 2. Thus, no test was actually conducted on the older adults of GROUP 2. To indicate this, the bar graphs indicating the test results on the older adults of GROUP 2 are drawn with dotted lines in FIG. 9.

The following will be understood from FIG. 9. The ratio is higher than 1 in both cases of the simple training and the video viewing training. Namely, the rate of detection of peripheral stimuli is improved after training, as compared with that before training. The rate of detection of peripheral stimuli is improved with respect to both the young adults and the older adults. While, the rate of increase of the detection rate in the peripheral task is higher in the case of the simple training, than that in the case of the video viewing training, the rate of increase of the detection rate in the dual task is same in the case of the video viewing training as that in the case of the simple training. For reducing visual work load, the video viewing training is more suitable for enhancing the visual ability of vehicle drivers, than the simple training.

It is to be understood that the present invention is not limited to the illustrated embodiment, but may be embodied with modifications, such as various design changes, based on the knowledge of those skilled in the art. The construction or configuration shown in each figure is merely used for explaining one example, and may be changed as appropriate provided that the modified construction or configuration can achieve substantially the same functions.

What is claimed is:

1. A visual training device comprising:
a training image display unit that outputs a training image including at least to figures that appear in a peripheral portion of a screen of a display;
a processed image output unit that superimposes the training image output from the training image display unit on a video content received from a location that is outside of the visual training device, and outputs a resulting image to the display, wherein
the video content received from the outside location includes one of pictures of a television program and pictures of a DVD,
the content of the training image is unrelated to the video content received from the outside location and the training image is disposed at one or more fixed locations on the video content and is not dependent on a location of the video content, and
the at least two first figures are used as peripheral stimuli, and the video content is used as a central stimuli; and
a test image output unit that outputs a test image including the at least two first figures and a second figure, the brightness of the second figure changing at substantially irregular intervals of time, wherein
the at least two first figures are presented at random, and the second figure is located at a middle of the screen of the display, and
a rate of detection of the peripheral stimuli is calculated.

2. The visual training device according to claim 1, further comprising:
a testing unit that detects the presence of a response entered by a user who recognizes appearance of the at least two first figures when the at least two first figures appear at the particular position on the screen of the display, while the test image is displayed.

3. The visual training device according to claim 1, wherein the video content is configured to be selected by a user.

4. The visual training device according to claim 1, wherein the one or more fixed locations of the training image on the video content is independent of a position of images in the video content.

5. The visual training device according to claim 1, wherein the rate of detection of peripheral stimuli is calculated by determining a ratio of the number of responses detected by the user, to the number of times a first figure of the at least two first figures appears in the peripheral portion of the screen.

6. A visual training method comprising:
outputting a training image including at least two first figures that appear in a peripheral portion of a screen of a display;
superimposing the output training image on a video content received from a location that is outside of the visual training device, and outputting a resulting image to the display, wherein
the video content received from the outside location includes one of pictures of a television program and pictures of a DVD,
the content of the training image is unrelated to the video content received from the outside location and the training image is disposed at one or more fixed locations on the video content and is not dependent on a location of the video content, and
the at least two first figures are used as peripheral stimuli, and the video content is used as a central stimuli;
outputting a test image including the at least two first figures and a second figure, the brightness of the second figure changing at substantially irregular intervals of time;
presenting the at least two first figures at random, the second figure being located at a middle of the screen of the display; and
calculating a rate of detection of the peripheral stimuli.

7. The visual training method according to claim 6, further comprising:
detecting the presence of a response entered by a user who recognizes appearance of the at least two first figures when the at least two first figures appear at the particular position on the screen of the display, while the test image is displayed.

8. The visual training method according to claim 6, wherein the one or more fixed locations of the training image on the video content is independent of a position of images in the video content.

9. The visual training method according to claim 6, further comprising:
calculating the rate of detection of peripheral stimuli by determining a ratio of the number of responses detected by the user, to the number of times a first figure of the at least two first figures appears in the peripheral portion of the screen.

10. A non-transitory computer-readable storage medium that stores computer-executable instructions for performing a visual training function, the visual training function comprising:
outputting a training image including at least two first figures that appear in a peripheral portion of a screen of a display;

superimposing the output training image on a video content received from a location that is outside of the visual training device, and outputting a resulting image to the display, wherein the video content received from the outside location includes one of pictures of a television program and pictures of a DVD, the content of the training image is unrelated to the video content received from the outside location and the training image is disposed at one or more fixed locations on the video content and is not dependent on a location of the video content, and the at least two first figures are used as peripheral stimuli, and the video content is used as a central stimuli;

outputting a test image including the at least two first figures and a second figure, the brightness of the second figure changing at substantially irregular intervals of time;

presenting the at least two first figures at random, the second figure being located at a middle of the screen of the display; and calculating a rate of detection of the peripheral stimuli.

11. The computer-readable storage medium according to claim 10, wherein the visual training function further comprises:

detecting the presence of a response entered by a user who recognizes appearance of the at least two first figures when the at least two first figures appear at the particular position on the screen of the display, while the test image is displayed.

12. The computer-readable storage medium according to claim 10, wherein the one or more fixed locations of the training image on the video content is independent of a position of images in the video content.

13. The computer-readable storage medium according to claim 10, wherein the visual training function further comprises:

calculating the rate of detection of peripheral stimuli by determining a ratio of the number of responses detected by the user, to the number of times a first figure of the at least two first figures appears in the peripheral portion of the screen.

* * * * *